United States Patent
Meng et al.

(10) Patent No.: US 12,493,795 B2
(45) Date of Patent: Dec. 9, 2025

(54) SYSTEMS AND METHODS FOR UNSUPERVISED TRAINING IN TEXT RETRIEVAL TASKS

(71) Applicant: Salesforce, Inc., San Francisco, CA (US)

(72) Inventors: Rui Meng, San Francisco, CA (US); Yingbo Zhou, Palo Alto, CA (US); Ye Liu, Fremont, CA (US); Semih Yavuz, Redwood City, CA (US); Ning Yu, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 373 days.

(21) Appl. No.: 18/303,313

(22) Filed: Apr. 19, 2023

(65) Prior Publication Data
US 2024/0202530 A1    Jun. 20, 2024

Related U.S. Application Data

(60) Provisional application No. 63/387,673, filed on Dec. 15, 2022.

(51) Int. Cl.
*G06N 3/084* (2023.01)
*G06F 40/20* (2020.01)
(Continued)

(52) U.S. Cl.
CPC .......... *G06N 3/084* (2013.01); *G06F 40/20* (2020.01); *G06F 40/40* (2020.01); *G06N 3/0455* (2023.01); *G06N 3/088* (2013.01)

(58) Field of Classification Search
CPC ...... G06N 3/084; G06N 3/0455; G06N 3/088; G06F 40/20; G06F 40/40
See application file for complete search history.

(56) References Cited

U.S. PATENT DOCUMENTS

2022/0179871 A1 * 6/2022 Ahmed ................. G06N 20/00

FOREIGN PATENT DOCUMENTS

WO    WO-2023098971 A1 *  6/2023    ............. G06N 5/041

OTHER PUBLICATIONS

Kenton Lee, Ming-Wei Chang, and Kristina Toutanova. 2019. Latent retrieval for weakly supervised open domain question answering. In Proceedings of the 57th Annual Meeting of the Association for Computational Linguistics, pp. 6086-6096.

(Continued)

*Primary Examiner* — Linda Wong
(74) *Attorney, Agent, or Firm* — Haynes and Boone, LLP

(57) ABSTRACT

Embodiments described herein provide systems and methods for training a text retrieval model. A system may generate queries associated with provided documents. The queries may be generated in one or more different manners. Examples of query generation may include extracting relevant spans of text from the documents, prompting a language model for a topic, title, abstractive summary, and/or extractive summary based on the documents. Metadata such as title or other HTML tags may be used as queries. Using the one or more queries, the text retrieval model may be trained using contrastive learning, using the generated query, and positive and negative sample documents. A fine-tuning training phase may be performed using domain-specific data which may also be done with generated query pairs, or may be done in a supervised fashion with provided queries. The text retrieval model may be used to locate documents given an input query.

15 Claims, 11 Drawing Sheets

(51) Int. Cl.
G06F 40/40 (2020.01)
G06N 3/0455 (2023.01)
G06N 3/088 (2023.01)

(56) References Cited

OTHER PUBLICATIONS

Kelvin Guu, Kenton Lee, Zora Tung, Panupong Pasupat, and Mingwel Chang. 2020. Retrieval augmented language model pre-training. In International Conference on Machine Learning, pp. 3929-3938. PMLR.
Gautier Izacard, Mathilde Caron, Lucas Hosseini, Sebastian Riedel, Piotr Bojanowski, Armand Joulin, and Edouard Grave. 2021. Towards unsupervised dense information retrieval with contrastive learning. arXiv e-prints, pp. arXiv-2112.
Ori Ram, Gal Shachaf, Omer Levy, Jonathan Berant, and Amir Globerson. 2021. Learning to retrieve passages without supervision. arXiv preprint arXiv:2112.07708.
Arvind Neelakantan, Tao Xu, Raul Puri, Alec Radford, Jesse Michael Han, Jerry Tworek, Qiming Yuan, Nikolas Tezak, Jong Wook Kim, Chris Hallacy, et al. 2022. Text and code embeddings by contrastive pre-training. arXiv preprint arXiv:2201.10005.
Xilun Chen, Kushal Lakhotia, Barlas Oğuz, Anchit Gupta, Patrick Lewis, Stan Peshterliev, Yashar Mehdad, Sonal Gupta, and Wen-tau Yih. 2021. Salient phrase aware dense retrieval: Can a dense retriever imitate a sparse one? arXiv preprint arXiv:2110.06918.

\* cited by examiner

| Group | Model | MM | BEIR14 | BEIR11 | QA4 | SQ&EQ |
|---|---|---|---|---|---|---|
| Baseline | BM25† | 22.8 | 42.9 | 46.1 | 70.7 | 71.3 |
| | Contriever† | 20.6 | 36.9 | 40.7 | 73.1 | 63.9 |
| | SPAR† | 19.3 | 37.3 | 41.4 | 69.1 | 67.7 |
| | Spider† | 15.0 | 28.1 | 31.3 | 73.0 | 63.6 |
| | CPT-text S | - | - | 42.2 | - | - |
| | CPT-text M | - | - | 43.2 | - | - |
| | CPT-text L | - | - | 44.2 | - | - |
| RandomCrop(Wiki) | InBatch | 14.0 | 25.3 | 28.0 | 61.9 | 44.9 |
| | MoCo | 17.5 | 30.9 | 34.1 | 64.6 | 52.5 |
| RandomCrop(CC) | InBatch | 16.3 | 27.4 | 30.6 | 73.2 | 57.7 |
| | MoCo | 19.2 | 34.0 | 37.5 | 71.5 | 61.9 |
| QGen-D2Q(Wiki) | InBatch | 25.4 | 38.5 | 42.5 | 78.6 | 67.1 |
| | MoCo | 23.7 | 38.5 | 42.3 | 77.4 | 67.4 |
| QGen-D2Q(CC) | InBatch | 24.4 | 39.5 | 42.8 | 75.6 | 63.2 |
| | MoCo | 23.2 | 39.8 | 43.7 | 76.6 | 65.6 |
| AUGTRIEVER-CC | | | | | | |
| Doc-Title | InBatch | 19.7 | 33.2 | 36.5 | 73.5 | 59.7 |
| | MoCo | 21.8 | 38.7 | 42.7 | 74.8 | 64.3 |
| QExt-PLM | InBatch | 16.2 | 27.2 | 40.4 | 73.4 | 57.9 |
| | MoCo | 20.6 | 38.2 | 42.3 | 73.0 | 64.1 |
| TQGen-Topic | InBatch | 20.7 | 39.0 | 43.0 | 71.6 | 60.5 |
| | MoCo | 21.2 | 38.9 | 43.1 | 73.3 | 63.4 |
| TQGen-AbSum | InBatch | 18.1 | 35.3 | 38.6 | 72.0 | 57.4 |
| | MoCo | 23.2 | 39.6 | 43.5 | 74.4 | 64.9 |
| TQGen-ExSum | InBatch | 18.9 | 36.3 | 39.6 | 72.8 | 58.7 |
| | MoCo | 23.0 | 39.4 | 43.4 | 74.8 | 64.9 |
| AUGTRIEVER-CC with Hybrid Strategies | | | | | | |
| Hybrid-All | MoCo | 23.5 | 39.4 | 43.3 | 74.1 | 64.4 |
| Hybrid-TQGen | MoCo | 23.3 | 39.0 | 43.7 | 74.3 | 64.4 |
| Hybrid-TQGen+ | MoCo | 24.6 | 41.1 | 45.2 | 76.0 | 65.9 |
| AUGTRIEVER-Wikipedia | | | | | | |
| Doc-Anchor | InBatch | 15.6 | 29.8 | 33.2 | 64.8 | 49.9 |
| | MoCo | 17.9 | 35.4 | 39.2 | 68.5 | 57.4 |
| Doc-Title | InBatch | 14.7 | 30.0 | 33.9 | 61.9 | 52.1 |
| | MoCo | 18.5 | 33.7 | 37.1 | 68.6 | 58.4 |
| QExt-PLM | InBatch | 15.0 | 26.3 | 28.2 | 61.5 | 43.8 |
| | MoCo | 18.6 | 34.3 | 37.8 | 66.6 | 55.7 |
| TQGen-Topic | InBatch | 21.3 | 38.9 | 43.2 | 72.4 | 64.4 |
| | MoCo | 21.3 | 38.3 | 42.5 | 73.6 | 65.3 |
| TQGen-AbSum | InBatch | 17.4 | 36.3 | 40.2 | 74.9 | 65.3 |
| | MoCo | 21.2 | 37.2 | 41.3 | 74.5 | 65.4 |
| TQGen-ExSum | InBatch | 18.2 | 36.7 | 40.2 | 75.6 | 65.4 |
| | MoCo | 22.5 | 37.9 | 41.8 | 75.1 | 66.7 |

FIG. 6

| | BEIR14 | TREC-COVID | NFCorpus | NQ | HotpotQA | FiQA | ArguAna | Touche | DBPedia | Scidocs | FEVER | CR-FEVER | Scifact | Quora | CQADup |
|---|---|---|---|---|---|---|---|---|---|---|---|---|---|---|---|
| BM25 | 22.8 | 42.9 | 65.6 | 32.5 | 32.9 | 60.3 | 23.6 | 31.5 | 34.7 | 31.3 | 15.8 | 75.3 | 21.3 | 66.5 | 78.9 | 29.9 |
| TQGen-Topic | 21.5 | 39.6 | 61.3 | 32.1 | 27.9 | 51.7 | 25.6 | 39.4 | 21.0 | 30.3 | 15.1 | 62.5 | 15.2 | 66.8 | 78.1 | 27.6 |
| +DA | 23.1 | 41.1 | 71.0 | 31.1 | 28.2 | 53.1 | 33.6 | 18.4 | 19.4 | 32.3 | 17.3 | 72.9 | 16.1 | 64.8 | 80.8 | 35.8 |
| diff% | 7.3% | 3.6% | 15.7% | -3.1% | 1.3% | 2.7% | 31.4% | -53.2% | -7.8% | 6.7% | 14.4% | 16.7% | 5.6% | -3.0% | 3.5% | 29.7% |

FIG. 7

| Group | Model | MM | BEIR14 | QA4 | SQ&EQ |
|---|---|---|---|---|---|
| Baseline | BM25† | 22.8 | 42.9 | 70.7 | 71.3 |
| | Contriever† | 37.7 | 44.5 | 82.0 | 73.8 |
| | SPAR† | 34.0 | 40.7 | 77.2 | 69.9 |
| | Spider† | 36.0 | 41.9 | 80.6 | 70.7 |
| RandomCrop | inBatch | 35.9 | 42.9 | 79.7 | 69.5 |
| | MoCo | 35.0 | 43.1 | 79.7 | 70.7 |
| QGen-D2Q | inBatch | 37.4 | 44.7 | 81.1 | 71.0 |
| | MoCo | 36.3 | 44.8 | 81.1 | 72.0 |
| Doc-Title | inBatch | 36.4 | 43.5 | 79.9 | 69.8 |
| | MoCo | 35.5 | 43.5 | 80.3 | 70.6 |
| QExt-PLM | inBatch | 36.1 | 42.7 | 79.8 | 69.7 |
| | MoCo | 35.7 | 43.3 | 79.6 | 70.8 |
| TQGen-Topic | inBatch | 36.9 | 44.3 | 80.3 | 70.6 |
| | MoCo | 35.7 | 43.5 | 80.4 | 71.0 |
| TQGen-Title | inBatch | 36.8 | 43.7 | 79.9 | 70.0 |
| | MoCo | 36.3 | 44.0 | 80.4 | 71.5 |
| TQGen-ExSum | inBatch | 36.5 | 44.0 | 80.2 | 69.9 |
| | MoCo | 36.1 | 44.1 | 80.4 | 71.5 |
| Hybrid-TQGen+ | MoCo | 37.0 | 45.0 | 81.1 | 72.5 |

FIG. 8

SYSTEMS AND METHODS FOR UNSUPERVISED TRAINING IN TEXT RETRIEVAL TASKS

CROSS REFERENCE(S)

The instant application is a nonprovisional of and claim priority under 35 U.S.C. 119 to U.S. provisional application No. 63/387,673, filed Dec. 15, 2022, which is hereby expressly incorporated by reference herein in its entirety.

TECHNICAL FIELD

The embodiments relate generally to machine learning systems for text retrieval tasks, and more specifically to a method for generating pseudo labels for text-based training data.

BACKGROUND

Machine learning systems have been widely used for text retrieval tasks, often referred to as dense retrievers. Existing methods for training dense retriever models mostly rely on training with a large amount of annotated data consisting of documents and associated queries generated by human annotators, which is prohibitively costly. On the other hand, many datasets with potential search interests are not annotated with search queries corresponding to its documents.

Therefore, there is a need for systems and methods for unsupervised training in text retrieval tasks.

BRIEF DESCRIPTION OF THE DRAWINGS

FIGS. 6-10 provide charts illustrating exemplary performance of different embodiments described herein.

Figure 1A:
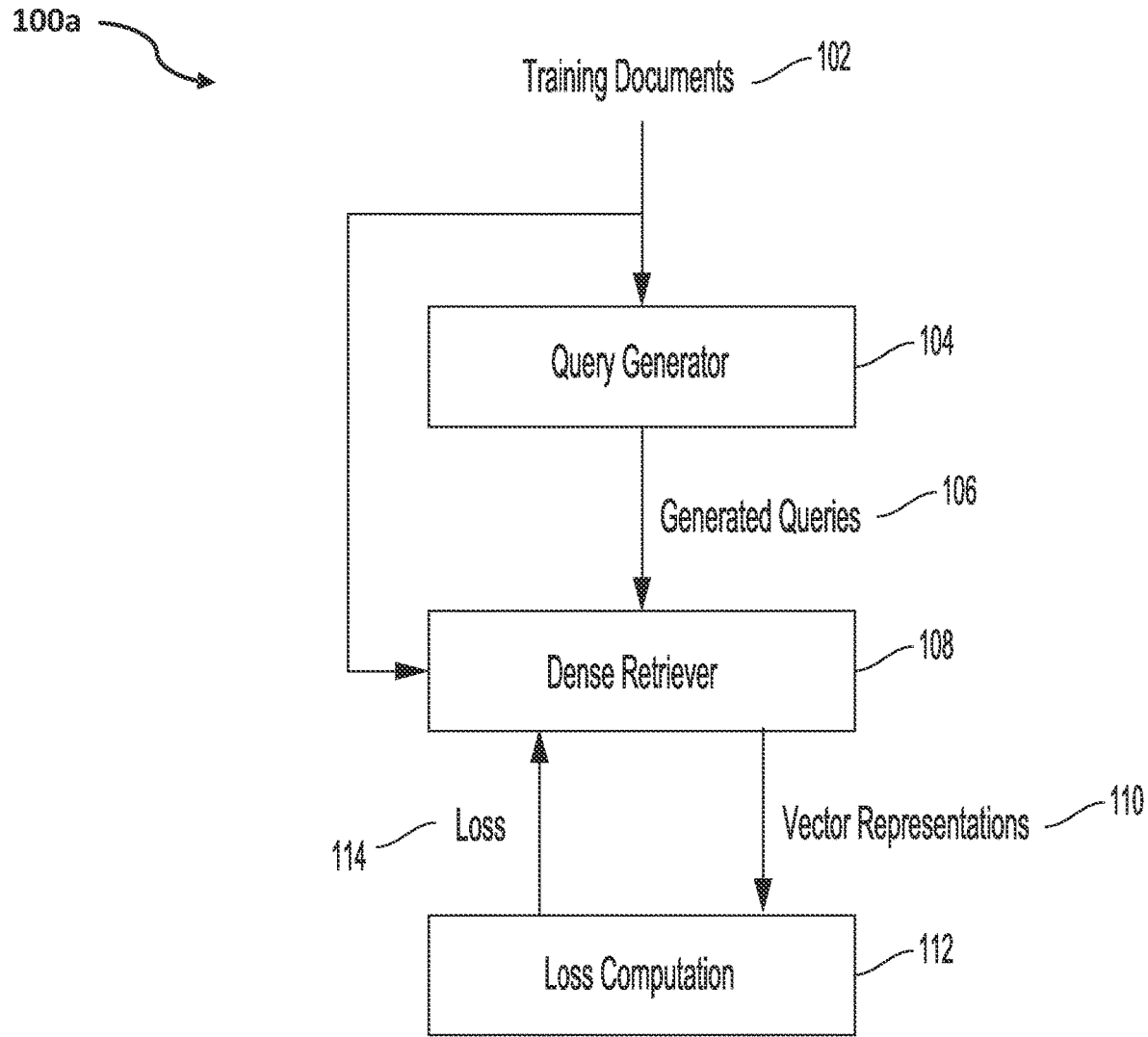
FIG. 1A is a simplified diagram illustrating a text retrieval model training framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Machine learning systems have been widely used for text retrieval tasks, often referred to as dense retrievers. Existing methods for training dense retriever models mostly rely on training with a large amount of annotated data consisting of documents and associated queries generated by human annotators, which is prohibitively costly. Many datasets with documents which one may want to search do not have queries associated with the documents.

In view of the need for systems and methods for unsupervised training in text retrieval tasks, embodiments described herein provide systems and methods for an unsupervised training mechanism for dense retrievers. Specifically, the training framework comprises a query generator that automatically generates queries using only the training documents themselves, so that the generated queries may be used in training a text retrieval (e.g., dense retriever) model. Various query generation methods described herein may be used independently, or in combination.

For example, in the query extraction method (QEXT), a number of spans of words in each document is randomly selected. Then, of the randomly selected spans, the span most relevant to the document, based on some metric, is selected as the training query (or one of the training queries) associated with the document from which the span was extracted.

For another example, in the transferred query generation method (TQGEN), a language model is used to produce training queries based on one or more prompts. For example, the language model may be prompted to provide an extractive summary, an abstractive summary, a topic, and a title of the document. Utilizing prompts allows for flexibility in adapting the prompts in order to improve the training performance. Alternatively, fixed models which do not use prompts may be used which may provide improved efficiency over a more flexible general model. The results of those prompts may be used as training queries.

In one embodiment, the document and generated query may form a training pair to train a bi-encoder dense retriever. In the bi-encoder dense retriever, the documents are encoded into vectors using a first encoder, and the queries are encoded into vectors using a second encoder. Given a query, documents may be ranked by comparing the document vectors to the query vector (e.g., by calculating the inner product of the vectors). Here, a contrastive learning scheme may be adopted, e.g., the dense retriever may be updated in a way such that the encoded representations of a query and a corresponding "positive" document (e.g., the document associated with the query) may be pulled closer together in the feature space, while representations of the query and a "negative" document (e.g., a randomly sampled document not associated with the query) are pushed away from each other. The queries used for training may be generated using QEXT, TQGEN, and/or other types of queries which may be generated in other ways described in more detail below. Further fine-tuning of the dense retriever model may be performed, for example using domain-specific training data. The domain-specific training data may be un-annotated, requiring further query generation, or there may be annotated domain-specific data, which allows for supervised fine-tuning to be performed.

Embodiments described herein provide a number of benefits. For example, by generating queries rather than relying on human-generated queries, larger datasets are more feasibly used for training. Generating queries allows for broad datasets to be used for a first training step, while still allowing for adaptation with domain-specific data and/or for fine-tuning with human-generated data. The extractive methods provide a relatively low computation cost as they are not generating text. Checking the salience of a small number of randomly selected spans allows for both better accuracy and more efficiency than checking every text span of a document. Transferred query generation is able to be performed using an existing task-specific generative model (e.g., summarization model) without any retraining.

Overview

FIG. 1A is a simplified diagram illustrating a text retrieval model training framework 100a according to some embodiments. The framework 100a comprises query generator 104, dense retriever model 108, and loss computation 112. Query generator 104 receives training documents 102 and generates generated queries 106. Dense retriever 108 (its encoder component) generates vector representations 110 of input training documents 102 and generated queries 106. Loss computation 112 computes a loss 114 based on vector representations 110. The loss 114 may then be used to update the dense retriever 108 via backpropagation.

In one embodiment, training documents 102 may include a group of documents such as websites, articles, or some other form of documents which contain text in some form. Query generator 104 receives training documents 102 and generates queries based on the documents. For example, given a training document describing and quoting the Gettysburg Address, a training query of "dedicated to the proposition that all men are created equal" may be generated such that when this training query is received, the document is supposed to be retrieved (from a set of documents) in response to the training query. Query generator 104 may generate queries in a number of different manners, discussed with respect to FIGS. 2A-2B.

In one embodiment, the dense retriever 108 generates vector representations 110 of training documents 102 and generated queries 106. Dense retriever 108 may be a neural-network based model that has a bi-encoder structure. For example, a first encoder of the bi-encoder structure may encode a set of generated training queries 106 into a set of vector representations, and a second encoder of the bi-encoder structure may encode a set of corresponding training documents into a set of vector representations. In this way, representations of a training document and a training query may be paired in the vector space, e.g., depending on the Euclidean distance between the respective vector representations of the document and the query.

In some embodiments, framework 100a uses contrastive learning to train a transformer based bi-encoder dense retriever 108. In other words, the loss computation module 112 receives vector representations 110 of the documents and queries, based on which a contrastive loss is computed. Specifically, the dense retriever 108 may comprise two transformer encoders (referred to as Eq and Ed) for encoding queries 106 $q$ and documents 102 $d$ respectively. The encoded query and document representations are relatively low-dimensional vectors generated by average pooling (over the word tokens) all output embeddings of the top layer of the respective encoder. A similarity score is obtained between q and d by calculating the inner product of the two vectors. The similarity score may be used to calculate a contrastive loss by loss computation 112. For example, a query 106 may be paired with a "positive" sample document 102 (e.g., the document 102 used to generate the query 106), and a "negative" sample document 102 (e.g., a randomly or otherwise selected document 102) in order for loss computation 112 to calculate a contrastive loss. Negative sample documents may be sampled from the same batch as the positive sample (referred to as INBATCH), or using a momentum document encoder (referred to as MoCo). In this way, by updating the dense retriever 108 based on a contrastive loss 114 computed by the loss computation 112, the dense retriever 108 is trained to generate encoded query representations that are closer to the encoded positive document representation, while pushing away the encoded representations of negative documents. At the start of training, the parameters of encoders of dense retriever 108 may be initialized with pretrained values.

Figure 1B:
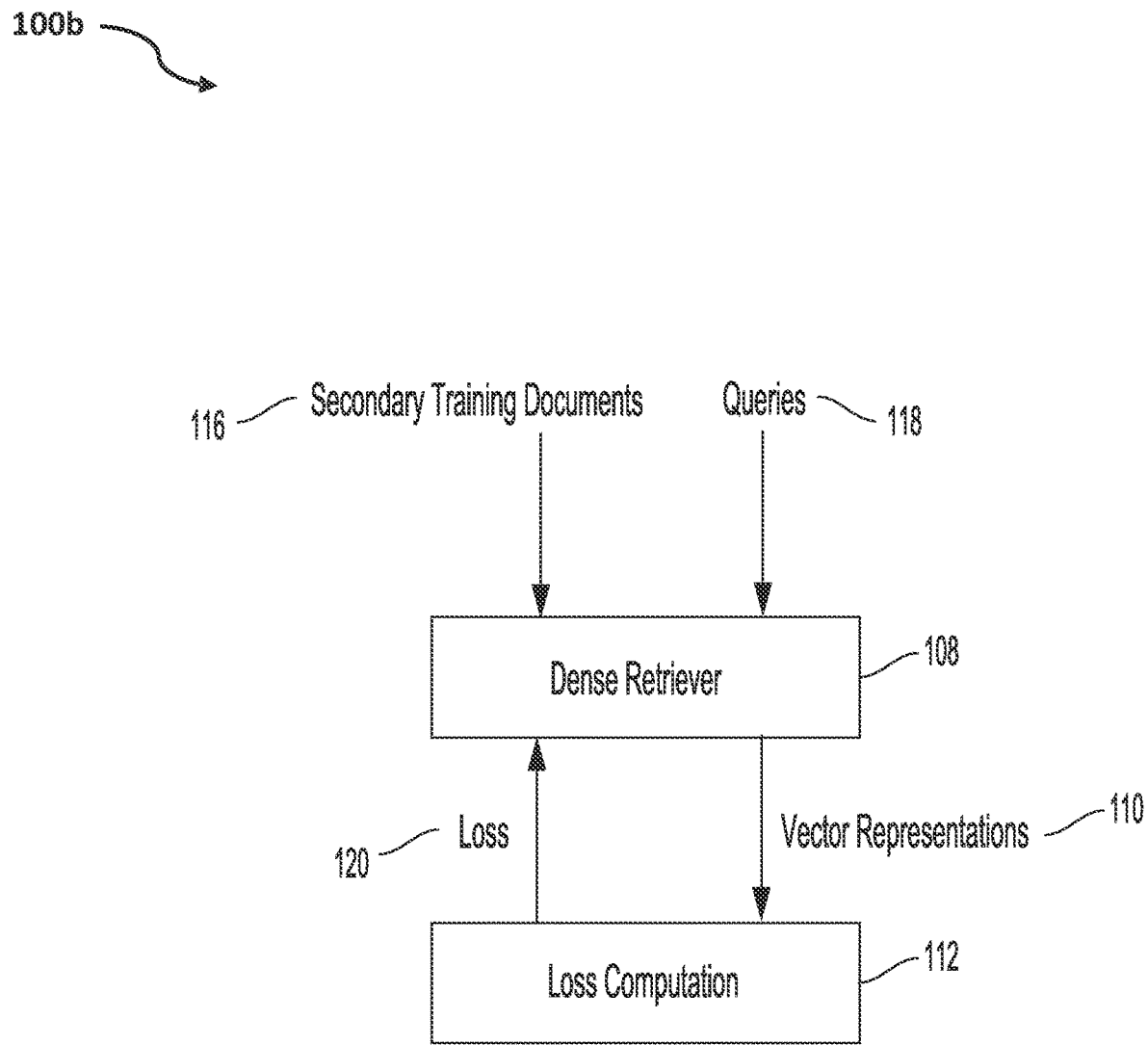
FIG. 1B is a simplified diagram illustrating a text retrieval model training framework according to some embodiments.

FIG. 1B is a simplified diagram illustrating a text retrieval model training framework 100b according to some embodiments. In some embodiments, a second stage fine-tuning training step may be performed according to framework 100b. Fine-tuning may be performed using secondary training documents 116 which may be paired with queries 118. Dense retriever 108 may generate vector representations 110 for secondary training documents 116 and queries 118, a finetuning loss (e.g., contrastive loss) may be computed by the loss computation module 112, and loss 120 may be used to update parameters of dense retriever 108 using backpropagation. As illustrated, the fine-tuning is using annotated data, which may be available for a specific tasks. The combination of unsupervised broad training according to framework 100a, and a subsequent fine-tuning with annotated data according to framework 100b allows the training to take advantage of the benefits of large training sets, and task-specific training sets at the same time. In some embodiments, there may be available domain-specific documents for training, but not annotated with corresponding queries. In this case, the domain-specific dataset may still be utilized by generating queries (e.g., via query generator 104 in FIG. 1A) as described herein.

Figure 2A:
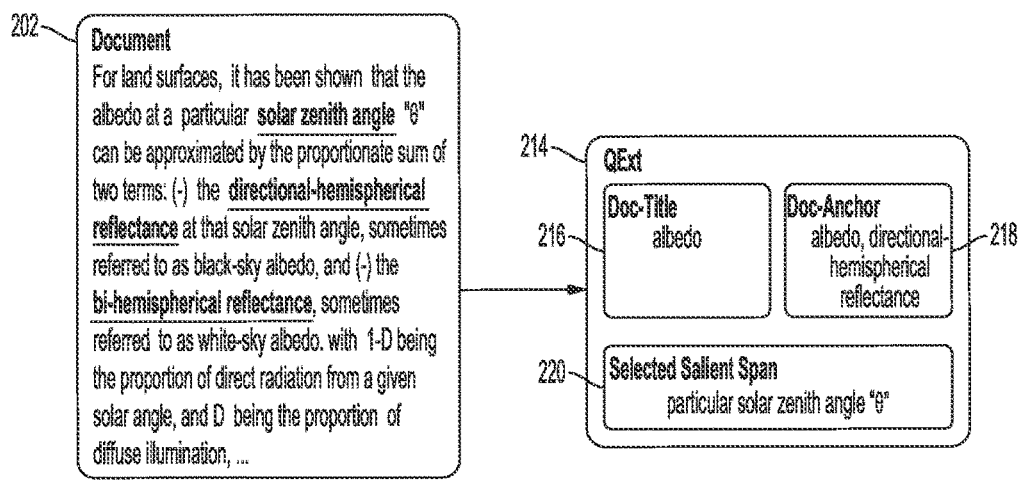
FIG. 2A is a simplified diagram illustrating one embodiment of query generation as described herein.

FIG. 2A is a simplified diagram illustrating one embodiment of query generation as described herein. Specifically, FIG. 2A illustrates query extraction (QExt) 214, which extracts queries from text within, or associated with the document 202 itself. For non-limiting example only, two types of information, titles (Doc-Title) 216 and anchor texts (Doc-Anchor) 218, may be extracted, which may be example representative of the core content of the document, either by the authors of the document or by other documents that refer to it. Both titles and anchor texts are relatively easy to extract using DOM structures and human-crafted heuristics. Note that all of the query generation methods described herein may be used alone or in any combination. When more than one query is generated for a single document, the document may be paired with different queries throughout the training process.

Instead of titles and anchor texts (or in addition), the QExt method may extract salient spans of text 220 from the body of the document 202. Formally, given a document 202 $d$, a sample of text spans $s_1, s_2, \ldots, s_N$ may be randomly sampled. For example, 16 random spans may be selected with length ranges from 4 to 16 words. The selected spans may be ranked by their salience to the document 202 as a whole. A number of methods may be used for measuring the salience of a text span.

In some embodiments, salience may be measured by the dense retrieval model itself. The dense retrieval model may be given each span $s_i$ paired with d, and use the dot-product score as their salience. This method is referred to as QExt-Self in FIGS. 9-10.

In some embodiments, salience may be measured using a pretrained lexical model. For example, BM25 is a model broadly used to measure the lexical relevancy between queries and documents. Thus it can also serve to select spans based on lexical statistics. This method is referred to as QExt-BM25 in FIGS. 9-10.

In some embodiments, salience may be measured using a pretrained language model. For example, a pretrained language model may measure salience by checking how likely a span can be generated given a document as the context. Specifically, a pretrained language model such as T5-small LM-Adapted model as described in Raffel et al., Exploring the limits of transfer learning with a unified text-to-text transformer, J. Mach. Learn. Res., 21(140):1-67, 2020. Using such a model, the document may be input as a prefix, and the likelihood $p(s_i|d)$ may be used as the salience score. This method is referred to as QExt-PLM in FIGS. 6-10

A query may be selected from the random spans based on the salience scores. For example, the random span with the highest salience score may be selected as the query. In other embodiments, the top k most salient spans may be selected as queries, where k is a predefined number. Other related methods may be used such as sampling spans for use as queries with a probability in proportion to their relative salience scores.

Figure 2B:
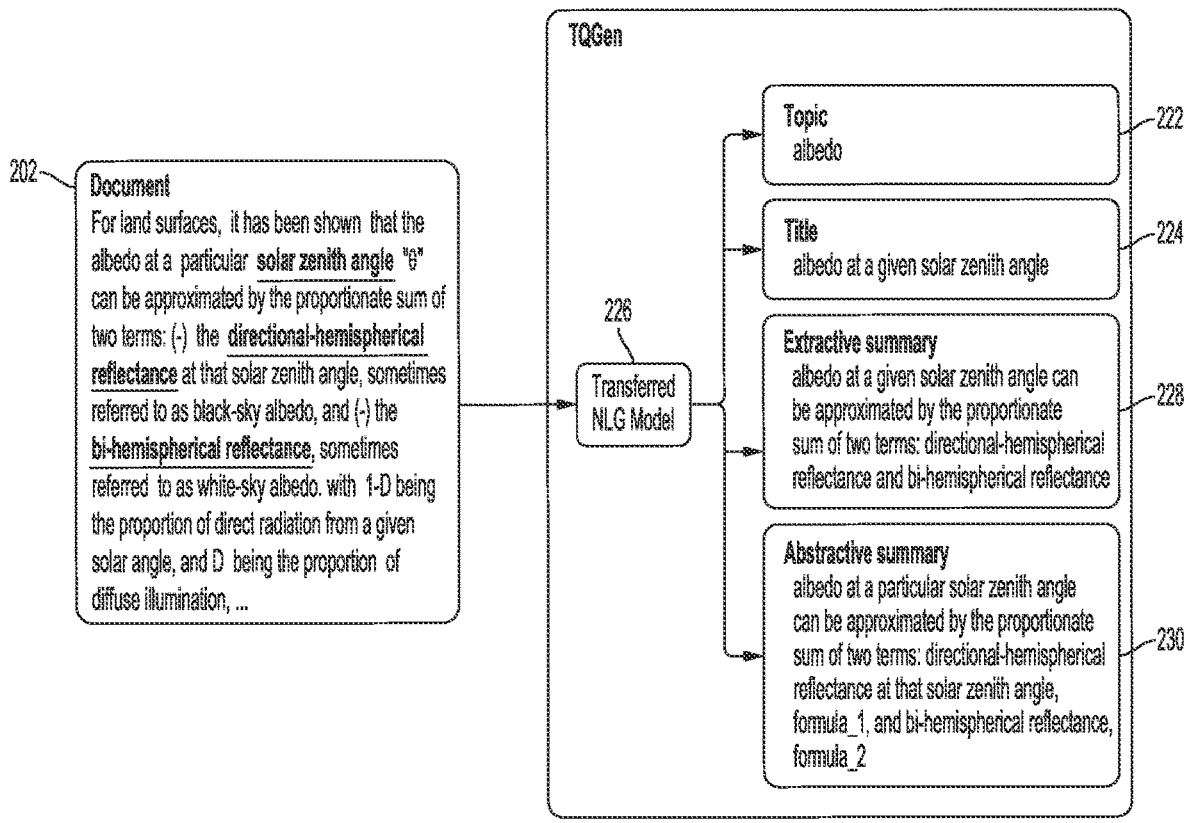
FIG. 2B is a simplified diagram illustrating one embodiment of query generation as described herein.

FIG. 2B is a simplified diagram illustrating one embodiment of query generation as described herein. Specifically, FIG. 2B illustrates transferred query generation (TQGen). Queries under this method are generated based on each document 202 by a language generation model 226 which has been trained for other natural language processing (NLP) tasks, e.g., summarization. Using a pretrained language model is beneficial as it requires a great amount of annotated data to train a model specifically as a query generator. Thus, the inductive bias for other tasks can be effective to bootstrap the training of the dense retriever model. Dense retrievers may benefit from the inductive bias of tasks such as summarization and keyphrase generation, since the outputs of those tasks are commonly regarded relevant and representative about the source text. In some embodiments, a single T0 model (3B parameters) may be used as a query generator, to avoid the computation cost of training specific models for each generation task.

Different prompts may be provided to the language model 226 in order to generate a variety of queries. As discussed above, each of the different ways of generating queries (including different language model prompts) may be used alone or in combination with queries generated in other ways. One prompt which may be used is a prompt for a topic 222. For example, the prompt may be "what is the main topic of the above text?" Another prompt may be for a title 224. For example, the prompt may be "please write a title of the text above." Another prompt may be for an extractive summary 228. For example, the prompt may be "please write a short summary of the text above." Another prompt may be for an extractive summary. For example, the prompt may be "please use a sentence in the above text to summarize its content." Examples of queries which may be used to generate queries are prompts for a topic 222, a title 224, an extractive summary 228, or an abstractive summary 230.

As discussed above, when more than one query is generated for a single document, the document may be paired with different queries throughout the training process, e.g., considered as "positive" pairs for the document to be paired with the different corresponding queries. Queries generated in a manner described herein may also be used together with queries generated using existing methods. For example, training may be performed with 10% QEXT-PLM generated queries, 70% DOC-TITLE+TQGEN queries, and 20% RandomCrop generated queries, where RandomCrop is an existing method described in Izacard et al., Toward unsupervised dense information retrieval with contrastive learning, arXiv: 2112.09118, 202.

Computer and Network Environment

Figure 3:
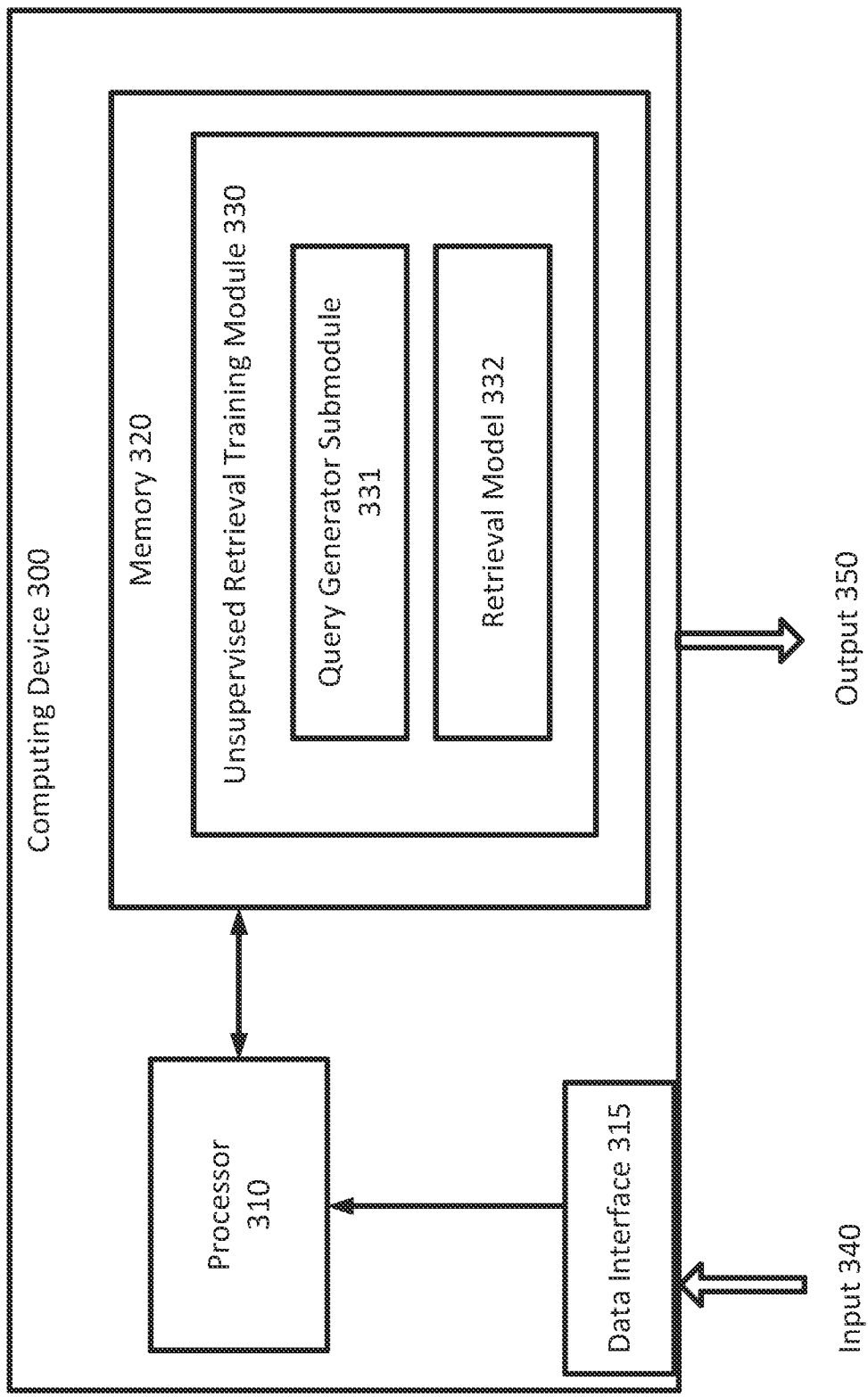
FIG. 3 is a simplified diagram illustrating a computing device implementing a text retrieval model framework described in herein, according to some embodiments.

FIG. 3 is a simplified diagram illustrating a computing device implementing the dense retrieval model framework described in FIGS. 1-2B, according to one embodiment described herein. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for text retrieval module 330 that may be used to implement and/or emulate the systems and models, and/or to implement any of the methods described further herein, text retrieval module 330 may receive input 340 such as an input training data (e.g., text documents) via the data interface 315 and generate an output 350 which may be a trained dense retrieval model, or document recommendations generated using the trained dense retrieval model. Examples of the input data may include general text documents, websites, knowledge articles, etc. Examples of the output data may include ranked lists of recommended documents, the top ranked document, etc.

The data interface 315 may comprise a communication interface, a user interface (such as a voice input interface, a graphical user interface, and/or the like). For example, the computing device 300 may receive the input 340 (such as a training dataset) from a networked database via a communication interface. Or the computing device 300 may receive the input 340, such as a query, from a user via the user interface.

In some embodiments, the text retrieval module 330 is configured to train a dense retrieval model using provided documents and queries generated based on the documents. The text retrieval module 330 may further include query generator submodule 331 (e.g., similar to query generator 104 in FIG. 1A). The text retrieval module 330 may further include retrieval model 332 (e.g., dense retriever 108 in FIGS. 1A-1B).

In one embodiment, the text retrieval module 330 and its submodules 331-332 may be implemented by hardware, software and/or a combination thereof.

In one embodiment, the text retrieval module 330 and one or more of its submodules 331-332 may be implemented via an artificial neural network. The neural network comprises a computing system that is built on a collection of connected units or nodes, referred to as neurons. Each neuron receives an input signal and then generates an output by a non-linear transformation of the input signal. Neurons are often connected by edges, and an adjustable weight is often associated with the edge. The neurons are often aggregated into layers such that different layers may perform different transformations on the respective input and output transformed input data onto the next layer. Therefore, the neural network may be stored at memory 320 as a structure of layers of neurons, and parameters describing the non-linear transformation at each neuron and the weights associated with edges connecting the neurons. An example neural network may be a bi-encoder model as discussed herein, and/or the like.

In one embodiment, the neural network based text retrieval module 330 and one or more of its submodules 331-332 may be trained by updating the underlying parameters of the neural network based on the loss described in relation to FIG. 1A. For example, the loss 114 described in FIG. 1A is a metric that evaluates how far away a neural network model generates a predicted output value from its target output value (also referred to as the "ground-truth" value). Given the loss computed according to the loss function, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4:
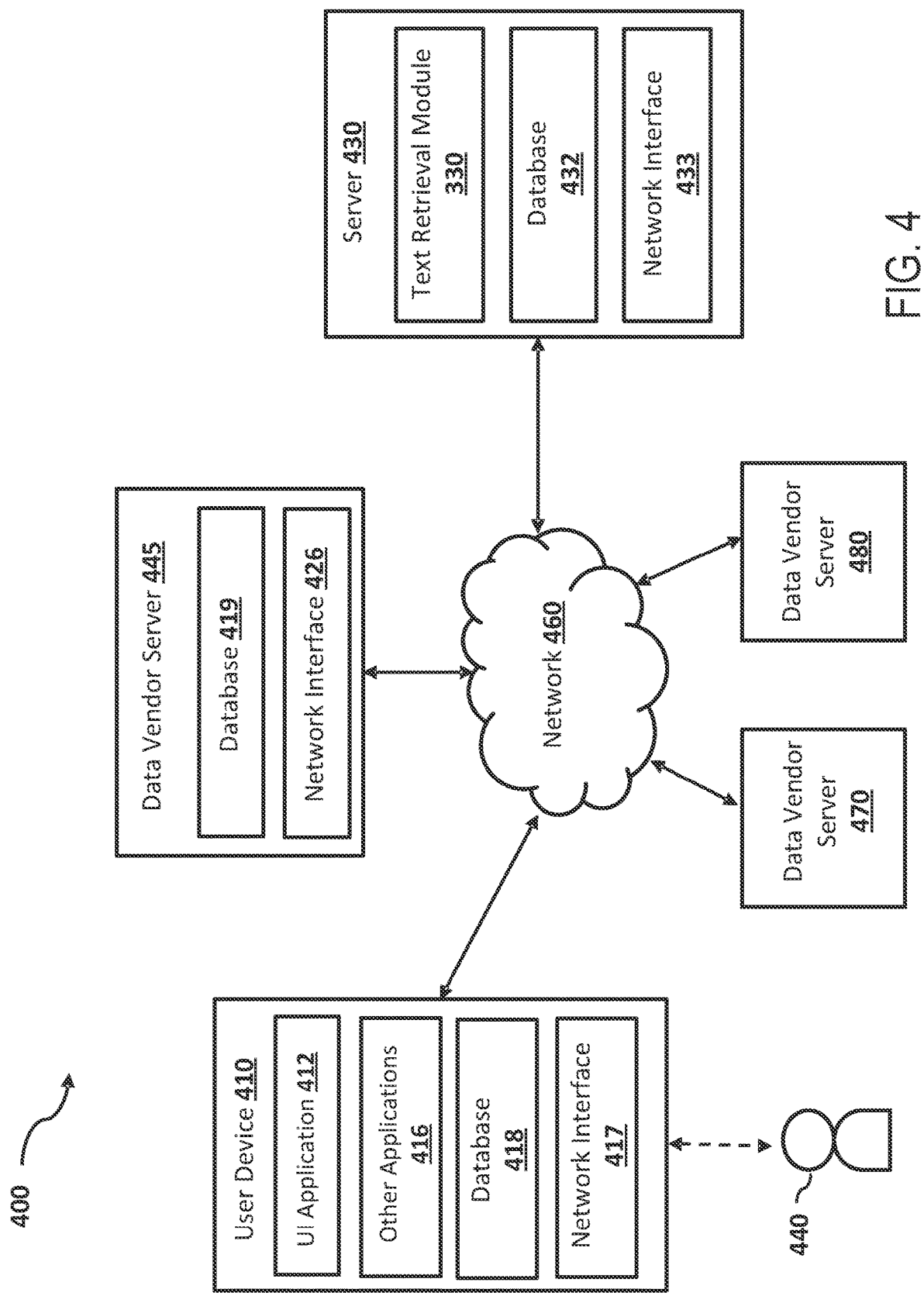
FIG. 4 is a simplified block diagram of a networked system suitable for implementing the text retrieval model framework according to some embodiments.

FIG. 4 is a simplified block diagram of a networked system 400 suitable for implementing the text retrieval model framework described in FIGS. 1-3 and other embodiments described herein. In one embodiment, system 400 includes the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 300 described in FIG. 3, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating a recommended document from the server 430 and display the message via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view recommended documents based on an input query.

User device 410 may further include database 418 stored in a transitory and/or non-transitory memory of user device 410, which may store various applications and data and be utilized during execution of various modules of user device 410. Database 418 may store user profiles relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 417 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts database 419 to provide training datasets including text documents to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 419, via the network interface 426, to the server 430.

The server 430 may be housed with the text retrieval module 330 and its submodules described in FIG. 3. In some implementations, text retrieval module 330 may receive data from database 419 at the data vendor server 445 via the network 460 to generate recommended documents. The generated document recommendations may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the text retrieval module 330. In one implementation, the database 432 may store previously generated vector representations of documents and/or queries, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Example Work Flows

Figure 5:
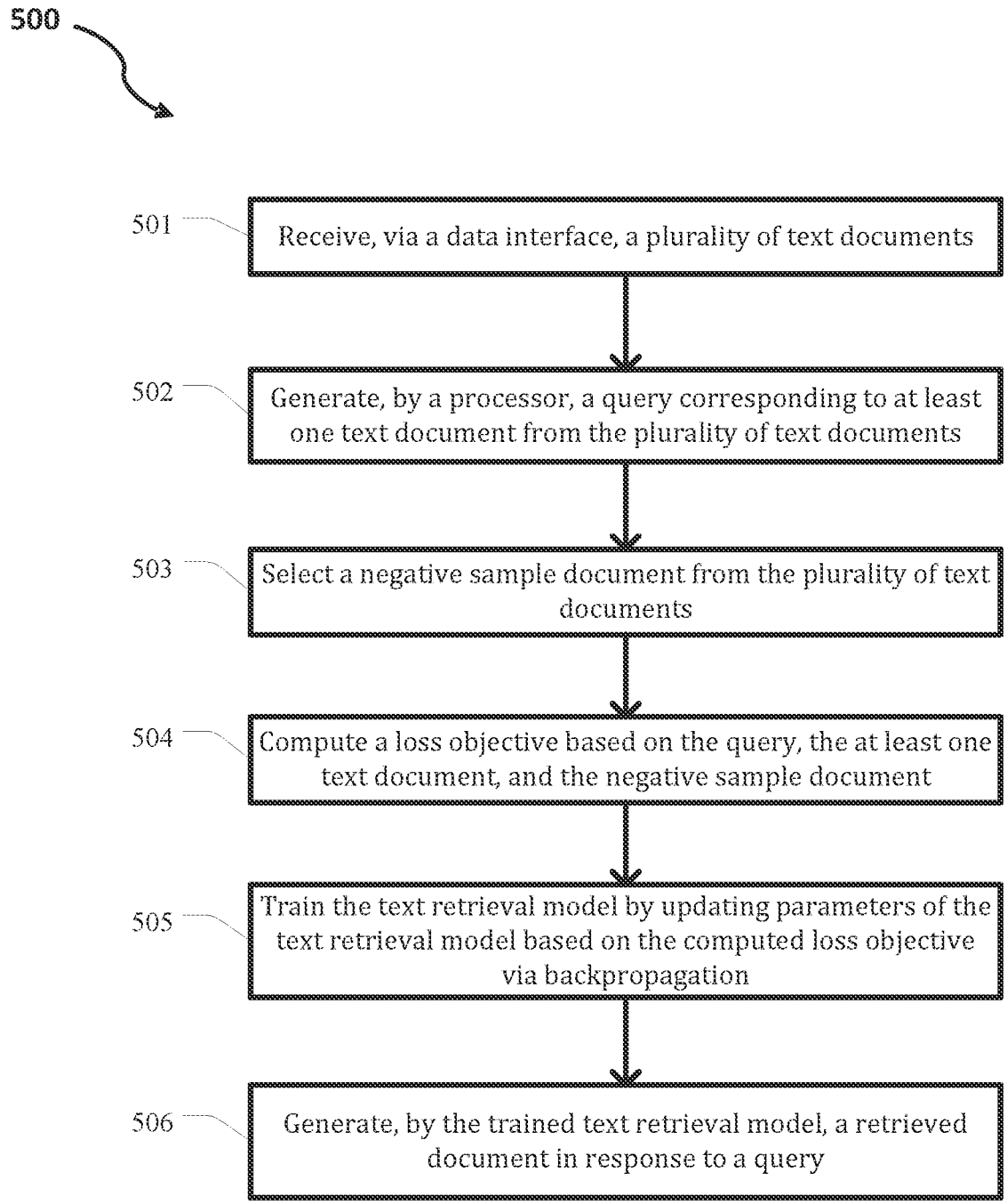
FIG. 5 is an example logic flow diagram illustrating a method of training a text retrieval model based on the framework shown in FIGS. 1-4, according to some embodiments described herein.

FIG. 5 is an example logic flow diagram illustrating a method of training a text retrieval model based on the framework shown in FIGS. 1-4, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the text retrieval module 330 (e.g., FIGS. 3-4) that performs query generation, training, and/or inference of the text retrieval model.

As illustrated, the method 500 includes a number of enumerated steps, but aspects of the method 500 may include additional steps before, after, and in between the enumerated steps. In some aspects, one or more of the enumerated steps may be omitted or performed in a different order.

At step 501, a system (e.g., computing device 300 of FIG. 3 or server 430 of FIG. 4) receives, via a data interface (e.g., data interface 315 of FIG. 3 or network interface 433 of FIG. 4), a plurality of text documents (e.g., training documents 102 of FIG. 1A or document 202 of FIG. 2). The text documents may be, for example, websites, knowledge articles, etc.

At step 502, the system generates, by a processor, a query corresponding to at least one text document from the plurality of text documents. The query may be generated by any of the methods described herein (e.g., QEXT, TQGEN, etc. as described in FIGS. 2A-2B). For example, extracting a text span from the at least one text document as the query based on a relevance level between the extracted text span and the at least one text document. In another example, meta-data associated with the document may be extracted such as a title or anchor text. In another example, the query may be generated by a pre-trained language model, generating a text output as the query based on an input of the at least one text document conditioned with a pre-defined prompt. The pre-defined prompt may include a prompt associated with at least one of a topic, a title, an extractive summary, or an abstractive summary. Further, the query may be comprised of multiple queries, generated using different methods.

At step 503, the system selects a negative sample document from the plurality of text documents. The negative sample document may be selected randomly from the remaining documents. In some embodiments, the positive document is not permitted to be selected as the negative document. In further embodiments, negative documents are selected based on the proximity of their encoded representation to the encoded representation of the query with which it will be paired during contrastive learning. For example, by training with negative samples which are generally close in representation space to the query, this may allow the model to more accurately distinguish between relatively similar documents.

At step 504, the system computes a loss objective based on the query, the at least one text document, and the negative sample document.

At step 505, the system trains the text retrieval model by updating parameters of the text retrieval model based on the computed loss objective via backpropagation. The computing the loss objective may be performed by computing a first loss objective based on a first query generated in a first manner, the at least one text document, and the negative sample document, and computing a second loss objective based on a second query generated in a second manner, the at least one text document, and the negative sample document.

For example, the text retrieval model may be a bi-encoder model trained using contrastive learning, where a query is paired with a positive sample document (e.g., the document used to generate the query), and a negative sample document (e.g., a randomly sampled document). Parameters of the two encoders of the bi-encoder model may be updated such that the resulting vector representations of the query and documents causes the query representation to approach the positive document representation, and recede from the negative document representation.

Training may be performed iteratively, further comprising computing the first loss objective in a first subset of training iterations, computing the second loss objective in a second subset of training iterations, wherein the relative frequency of computing the first loss objective and computing the second loss objective is determined based on a preselected value. For example, as discussed above, different types of queries (i.e., queries generated using different methods) may be used in different relative proportions during training.

After the initial training with the plurality of text documents, the system may further train the text retrieval model using additional data (e.g., domain-specific documents). The system may receive, via the data interface, a second plurality of text documents (e.g., secondary training documents 116 of FIG. 1B). The system may compute a second loss objective based on at least one text document of the second plurality of text documents, and train the text retrieval model by updating parameters of the text retrieval model based on the computed second loss objective.

The fine-tuning may be performed using queries received by the system (i.e., supervised training) or by using generated queries (i.e., unsupervised). For example, in the supervised case, the system may receive, via the data interface, a plurality of queries associated with the second plurality of text documents, wherein the computing the second loss objective is further based on the plurality of queries. In the unsupervised case, the system may generate, by the processor, a second query corresponding to at least one text document from the second plurality of text documents, wherein the computing the second loss objective is further based on the second query.

At step 506, the trained text retrieval model may then be used to generate a retrieved document. For example, in response to a testing query, the trained text retrieval model may retrieve a text document, from a database of candidate text documents, as relevant to the testing query. A trained text retriever model may be used to recommend documents based on a provided query. For example, a user may enter a query via a user interface (e.g., on User Device 410 of FIG. 4). The user interface may communicate the query to the model, which encodes the query to a vector representation using the trained model parameters. The system may compare the query's vector representation to the vector representations of the documents, which may be encoded at the time, or previously encoded and stored (e.g., in database 419 or database 430 of FIG. 4). The document with the vector representation closest to the query representation may be recommended to the user by displaying the title, a link, and/or the document itself on the user interface. In some embodiments, the documents are ranked based on proximity to the query, and the user may be presented with multiple documents in order of relevance based on the model.

Example Results

FIGS. 6-10 provide charts illustrating exemplary performance of different embodiments described herein. Embodiments described herein are referred to in FIGS. 6-10 as augmented retriever (AugTriever). The AugTriever models may use either INBATCH or MoCo as discussed above with respect to FIG. 1A. The architectures are initialized with BERT-base as described in Devlin et al., BERT: Pre-training of deep bidirectional transformers for language understanding, Proceedings of the 2019 Conference of the North American Chapter of the Association for Computational Linguistics: Human Language Technologies, Volume 1 (Long and Short Papers), pp. 4171-4186, 2019. Most settings were adopted as used by CONTRIEVER as described in Izacard et al., Toward unsupervised dense information retrieval with contrastive learning, arXiv:2112.09118, 2021, for unsupervised training, except for a smaller training scale. Specifically, AugTriever is trained with (1) 100 k steps for most, and 200 k steps for HYBRID-TQGEN+, (2) batch size of 1,024 for most, 2,048 for Pile-CC with TQGEN/QGEN/HYBRID, (3) learning rate (lr) of 5e-5 and 10 k steps of linear warmup, (4) ADAM optimizer, and (5) queue size of 16,384 (for MoCo), which are considerably smaller comparing with CONTRIEVER (500 k steps, batch size 2048, queue size 131,072). Certain performance gains are realized with longer training and larger batch size, but a queue size of larger than 16,384 deteriorates the performance. For domain adaptation, a pre-trained model was trained with 5 k steps, batch size of 1,024 and lr of 5e-5. For fine-tuning, models were trained with extra 20 k steps, batch size of 1,024 and 1,024 extra random negative examples (1 positive+2,047 negative), and lr of $5e^{-5}$.

Baselines used for comparison include BM25 as a lexical baseline and three dense baselines—Contriever as described in Izacard et al., Toward unsupervised dense information retrieval with contrastive learning, arXiv:2112.09118, 2021; Spider as described in Ram et al., Learning to retrieve passages without supervision, arXiv:2112.07708, 2021; and Spar Λ (Wikipedia version) as described in Chen et al, Salient phrase aware dense retrieval: Can a dense retriever imitate a sparse one? arXiv:2110.06918. Scores are reported if publicly available (BEIR results of BM25 and Contriever), or the results reproduced using public code and checkpoints († indicates a reproduced result). MoCo+RandomCrop can be regarded as a reproduced Contriever in a smaller scale. Additional baselines with generated queries using a supervised Doc2Query as described in Nogueira et al., From doc2query to docttttquery, Online preprint, 6, 2019, and questions PAQ as described in Lewis et al., Paq: 65 million probably-asked questions and what you can do with them, Transactions of the Association for Computational Linguistics, 9:1098-1115, 2021, referred to as QGen-D2Q and QGen-PAQ respectively.

Two benchmarks are used for evaluation—BEIR as described in Thakur et al., Beir: A heterogeneous benchmark for zero-shot evaluation of information retrieval models, Thirty-fifth Conference on Neural Information Processing Systems Datasets and Benchmarks Track (Round 2), 2021, and six open domain question answering (ODQA) datasets consisting of questions posed via human annotation on a set of Wikipedia articles, including: Natural Questions (NQ) as described in Kwiatkowski, Tom, et al. *"Natural questions: a benchmark for question answering research." Transactions of the Association for Computational Linguistics* 7 (2019): 453-466, TriviaQA (TQA) as described in Joshi, Mandar, et al. *"Triviaqa: A large scale distantly supervised challenge dataset for reading comprehension." arXiv preprint arXiv:* 1705.03551 (2017), WebQuestions (WebQ) as described in Berant, Jonathan, et al. *"Semantic parsing on freebase from question-answer pairs." Proceedings of the* 2013 *conference on empirical methods in natural language processing.* 2013, CuratedTREC (TREC) as described in Baudiš, Petr, and Jan Šedivý. *"Modeling of the question answering task in the yodaqa system." Experimental IR Meets Multilinguality, Multimodality, and Interaction: 6th International Conference of the CLEF Association, CLEF'15*, Toulouse, France, Sep. 8-11, 2015, *Proceedings* 6. Springer International Publishing, 2015, SQUAD v1.1 (SQ) as described in Rajpurkar, Pranav, et al. *"Squad: 100,000+ questions for machine comprehension of text." arXiv preprint arXiv:*1606.05250 (2016), EntityQuestions (EQ) as described in Sciavolino, Christopher, et al. *"Simple entity-centric questions challenge dense retrievers." arXiv preprint arXiv:*2109.08535 (2021). BEIR may be a better benchmark for information retrieval, as it covers a broader range of domains and a wide variety of query types. Scores are also presented using the MS MARCO dataset as described in Bajaj et al., MS MARCO: A Human Generated MAchine Reading Comprehension Dataset, arXiv: 1611.09268, 2016. Scores of MS MARCO (MM) are discussed separately, since it is one of the most studied information retrieval test sets.

On the other side, all ODQA datasets are based on Wikipedia and mainly designed for evaluating question answering systems, thus it may be subject to certain domain/task bias. Scores are also illustrated based on the Stanford Question Answering Dataset SQUAD v1.1 (SQ) and EntityQuestions (EQ) as described in Sciavoline et al., Simple Entity-Centric Questions Challenge Dense Retrievers, arXiv:2109.08535, 2021.

FIG. 6 illustrates Unsupervised scores (MM/BEIR nDCG@10 and ODQA Recall@20) of AugTriever and baselines. MM denotes scores on MS MARCO. QA4 denotes averaged scores of NQ TQA, WebQ and. As for baseline results, FIG. 6 illustrates that BM25 leads on most benchmarks by a large margin. Among the three dense retrievers, the lexical-oriented retriever SPAR A performs the best on BEIR14 and SQ&EQ, which indicates that dense retrievers can achieve robust retrieval performance by lexical matching. CONTRIEVER performs comparably with SPAR A on BEIR, and it outperforms others on MM and QA4. Supervised augmentation baseline QGEN-D2Q delivers very competitive results on both benchmarks, suggesting that query generation trained with MS MARCO can work decently for both in-domain and out-of-domain datasets.

As for AugTriever, FIG. 6 illustrates that multiple variants can outperform three dense baselines on BEIR significantly, especially the ones trained with domain-general data Pile-CC. Also, multiple variants achieve better scores than BM25 on MM and QA4. Most notably, the best results are achieved by combining different strategies (Hybrid —*) and longer training (Hybrid-TQGEN+). Hybrid-TQGEN+ even outperforms CPT-text L (as described in Neelakantan et al., Text and code embeddings by contrastive pretraining, arXiv: 2201.10005, 2022) on BEIR, which is 20 times larger than AugTriever models. The empirical results strongly suggest the effectiveness of the augmentation methods described herein.

Specifically, TQGEN achieves the overall best performance, which suggests that the outputs of transferred generation tasks, e.g., keyword and summary generation, can be directly carried over into training dense retrieval models. Further, TQGEN-TOPIC generalizes well under all settings, indicating that keywords could serve as robust surrogate queries. MOCO+QEXT-PLM exhibits better results to all dense baselines on BEIR. This signifies that query extraction can work as a good unsupervised method, especially when trained with domain-general data.

FIG. 7 illustrates results of INBATCH-TQGEN-TOPIC with unsupervised domain adaptation (DA) with BEIR in-domain data. Results represent an InBatch model pre-trained with Pile-CC and TQGEN-TOPIC, and fine-tuned with in-domain pseudo query-document pairs, i.e. generated pseudo queries (main topics) for documents in each BEIR dataset.

As illustrated, on most domains (BEIR testsets) this method can still lead to significant improvements (up to 30%), suggesting the efficacy of adapting models with in-domain data. Out of 15 BEIR datasets, domain adaptation leads to positive impacts on 11 of them, and it outperforms BM25 on 7 datasets (only 3 if w/o DA). The model gains the most in domains that are specific and distant from the pretraining distribution, such as finance (FiQA) and science (COVID, Scidocs). However, negative impacts are observed in four domains that only a small number of documents are available. Except for Touché—2020, the remaining three testsets offer no more than 10 k documents, which might have caused overfitting.

FIG. 8 illustrates retrieval scores after fine-tuning with MS MARCO. All AugTriever models were pre-trained on Pile-CC. All AugTriever models attain significant improvements after fine-tuning. AugTriever models outperform most baseline models by a clear margin, indicating the effectiveness of using AUGQ for pretraining. The best model Hybrid-TQGEN+performs better than CONTRIEVER on BEIR (45.0 vs. 44.5), but it lags behind on MS MARCO and ODQA datasets, which may be partially attributed to the fact that CONTRIEVER was pre-trained with both Wikipedia and Pile-CC and its training is much longer (500 k steps vs. 200 k steps).

In most cases, the trend of fine-tuned scores is consistent with that of unsupervised ones, strongly evidences that the inductive bias from various augmentation measures is beneficial for downstream retrieval tasks. InBatch outperforms MoCo counterpart on MS MARCO and BEIR, but lags behind on ODQA datasets. INBATCH+TQGEN-TOPIC is the most performant variant among all, followed by other TQGEN variants, DOC-TITLE and QEXT-PLM. The relative advantage of MoCo under the unsupervised setting is not carried over to the fine-tuned results, probably because of the architecture inconsistency between pretraining and fine-tuning.

Figure 9:
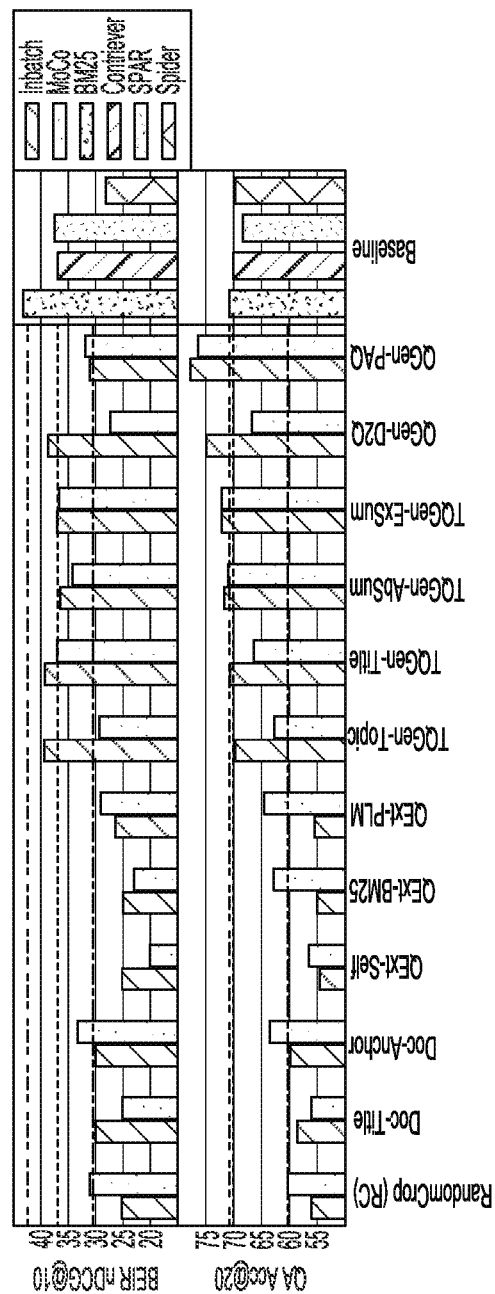

FIG. 9 illustrates relative performance of AugTriever and baselines by averaging scores of 14 BEIR datasets and 6 ODQA datasets. As illustrated, BM25 leads with a clear margin among all models, remaining a competitive unsupervised baseline.

Figure 10:
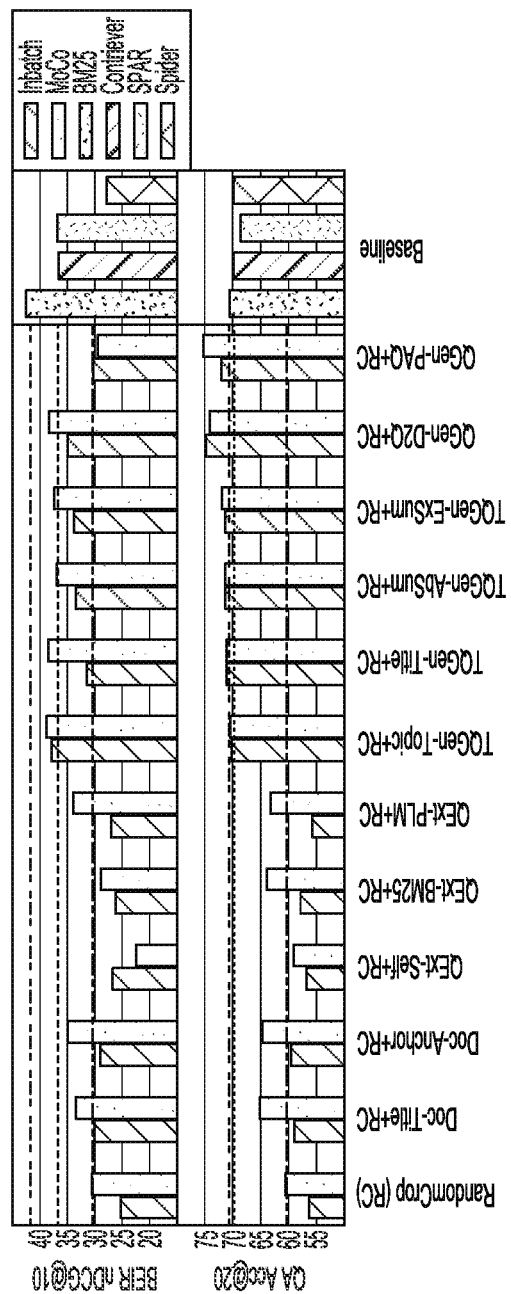

FIG. 10 illustrates relative performance of AugTriever trained on Wikipedia with hybrid strategies (50/50 mix of RANDOMCROP and another augmentation). As illustrated, MoCo obtains consistent gains by mixing individual augmentation methods with RANDOMCROP, performing on par with the best results of InBatch without RANDCOMCROP. This manifests that MoCo can take advantage of multiple strategies, resulting in better generalization ability.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a text retrieval model, the method comprising:
   receiving, via a data interface, a plurality of text documents;
   generating, by a processor, a query corresponding to at least one text document from the plurality of text documents, wherein the generating includes at least one of:
   (a) extracting a text span from the at least one text document as the query based on a relevance level between the extracted text span and the at least one text document; or
   (b) generating, by a pre-trained language model, a text output as the query based on an input of the at least one text document conditioned with a pre-defined prompt;
   selecting a negative sample document from the plurality of text documents;
   computing a first loss objective based on the query, the at least one text document, and the negative sample document;
   training the text retrieval model by updating parameters of the text retrieval model based on the computed first loss objective via backpropagation;
   receiving, via the data interface, a second plurality of text documents;
   computing a second loss objective using at least one text document of the second plurality of text documents as a finetuning dataset, wherein the second plurality of text documents are annotated with a plurality of queries, respectively, and, wherein the second loss objective is a contrastive loss based on the plurality of queries and the second plurality of text documents; and
   finetuning the trained text retrieval model by updating the parameters of the text retrieval model based on the computed second loss objective.

2. The method of claim 1, further comprising:
   generating, by the processor, a second query corresponding to at least one text document from the second plurality of text documents,
   wherein the computing the second loss objective is further based on the second query.

3. The method of claim 1, further comprising:
   generating multiple queries corresponding to the at least one text document, wherein the multiple queries are generated in more than one manner.

4. The method of claim 1, wherein the text span is further extracted from a metadata from the at least one text document.

5. The method of claim 1, wherein the pre-defined prompt includes a prompt associated with at least one of:
   a topic,
   a title,
   an extractive summary, or
   an abstractive summary.

6. The method of claim 1, further comprising:
   training the text retrieval model using queries generated in different manners at different training iterations.

7. The method of claim 6, wherein the training is performed iteratively, wherein a relative frequency of using queries generated in different manners is determined based on a preselected value.

8. A system for training a text retrieval model, the system comprising:
- a memory that stores the text retrieval model and a plurality of processor executable instructions;
- a communication interface that receives a plurality of text documents; and
- one or more hardware processors that read and execute the plurality of processor-executable instructions from the memory to perform operations comprising:
  - generating, by a processor, a query corresponding to at least one text document from the plurality of text documents, wherein the generating includes at least one of:
    - (a) extracting a text span from the at least one text document as the query based on a relevance level between the extracted text span and the at least one text document; or
    - (b) generating, by a pre-trained language model, a text output as the query based on an input of the at least one text document conditioned with a pre-defined prompt;
  - selecting a negative sample document from the plurality of text documents;
  - computing a first loss objective based on the query, the at least one text document, and the negative sample document;
  - training the text retrieval model by updating parameters of the text retrieval model based on the computed first loss objective via backpropagation;
  - receiving, via a data interface, a second plurality of text documents;
  - computing a second loss objective using at least one text document of the second plurality of text documents as a finetuning dataset, wherein the second plurality of text documents are annotated with a plurality of queries, respectively, and, wherein the second loss objective is a contrastive loss based on the plurality of queries and the second plurality of text documents; and
  - finetuning the trained text retrieval model by updating the parameters of the text retrieval model based on the computed second loss objective.

9. The system of claim 8, the operations further comprising:
- generating, by the processor, a second query corresponding to at least one text document from the second plurality of text documents,
- wherein the computing the second loss objective is further based on the second query.

10. The system of claim 8, the operations further comprising:
- generating multiple queries corresponding to the at least one text document, wherein the multiple queries are generated in more than one manner.

11. The system of claim 8, wherein the text span is further extracted from a metadata from the at least one text document.

12. The system of claim 8, wherein the pre-defined prompt includes a prompt associated with at least one of:
- a topic,
- a title,
- an extractive summary, or
- an abstractive summary.

13. The system of claim 8, the operations further comprising:
- training the text retrieval model using queries generated in different manners at different training iterations.

14. The system of claim 13, wherein the training is performed iteratively, wherein a relative frequency of using queries generated in different manners is determined based on a preselected value.

15. A non-transitory machine-readable medium comprising a plurality of machine-executable instructions which, when executed by one or more processors, are adapted to cause the one or more processors to perform operations comprising:
- receiving, via a data interface, a plurality of text documents;
- generating, by a processor, a query corresponding to at least one text document from the plurality of text documents, wherein the generating includes at least one of:
  - (a) extracting a text span from the at least one text document as the query based on a relevance level between the extracted text span and the at least one text document; or
  - (b) generating, by a pre-trained language model, a text output as the query based on an input of the at least one text document conditioned with a pre-defined prompt;
- selecting a negative sample document from the plurality of text documents;
- computing a first loss objective based on the query, the at least one text document, and the negative sample document;
- training a text retrieval model by updating parameters of the text retrieval model based on the computed first loss objective via backpropagation;
- receiving, via the data interface, a second plurality of text documents;
- computing a second loss objective using at least one text document of the second plurality of text documents as a finetuning dataset, wherein the second plurality of text documents are annotated with a plurality of queries, respectively, and, wherein the second loss objective is a contrastive loss based on the plurality of queries and the second plurality of text documents; and
- finetuning the trained text retrieval model by updating the parameters of the text retrieval model based on the computed second loss objective.

* * * * *